United States Patent [19]

Spielman et al.

[11] Patent Number: 5,088,052
[45] Date of Patent: Feb. 11, 1992

[54] SYSTEM FOR GRAPHICALLY REPRESENTING AND MANIPULATING DATA STORED IN DATABASES

[75] Inventors: Howard A. Spielman, Sharon; C. J. Considine, Newton, both of Mass.

[73] Assignee: Digital Equipment Corporation, Maynard, Mass.

[21] Appl. No.: 219,652

[22] Filed: Jul. 15, 1988

[51] Int. Cl.⁵ .............................................. G06F 15/62
[52] U.S. Cl. ................................................. 395/158
[58] Field of Search .................. 364/518, 521, 523; 382/41–47; 340/721, 723

[56] References Cited

U.S. PATENT DOCUMENTS

| | | | |
|---|---|---|---|
| 4,649,513 | 3/1987 | Martin et al. | 364/900 |
| 4,665,555 | 5/1987 | Alker et al. | 382/41 |
| 4,685,068 | 8/1987 | Greco, II et al. | 364/518 |
| 4,713,754 | 12/1987 | Agarwal et al. | 364/300 X |
| 4,782,463 | 11/1988 | Sanders et al. | 364/900 |
| 4,791,561 | 12/1988 | Huber | 364/200 X |
| 4,805,099 | 2/1989 | Huber | 364/200 X |

*Primary Examiner*—Heather R. Herndon
*Attorney, Agent, or Firm*—Fish & Richardson

[57] ABSTRACT

A system includes one or more databases, a terminal for use by a user and a processor. The databases store data and retrieve the stored data in response to the receipt of a data retrieval request from the processor. The terminal generates an input screen and an output screen. The input screen displays, for the user, data selection criteria identifiers which the user may select to identify data of interest, and functions for processing the data as desired by the user. The output screen displays the processed data. The processor generates, in response to the selected data selection criteria from said terminal, a data retrieval request for processing by the databases. Upon receipt of the retrieved data, the processor processes the retrieved data as called for by the selected function selection criteria to generate processed data, which the processor transmits to the terminal for display on the output screen. In a refinement, the processed data is identified by a data type, and said processor selecting a display type, for example, a line graph, bar graph, or other, based on the data type of the processed data, by which the output screen displays the data.

7 Claims, 2 Drawing Sheets

SYSTEM FOR GRAPHICALLY REPRESENTING AND MANIPULATING DATA STORED IN DATABASES

BACKGROUND OF THE INVENTION

The invention relates generally to the field of digital data processing systems and more specifically to systems for managing, retrieving, processing and reporting of data organized in one or more databases in a digital data processing system.

Computers have been used for a number of years in scientific and business applications. In scientific applications, computers often are used to perform computationally-intensive operations on, generally, relatively small amounts of data. In business applications, on the other hand, the computation required is generally much less than in scientific applications, but often the volume of data is substantially greater.

To assist in developing applications for managing large volumes of data, database management systems have been developed. Database management systems typically provide a structured data storage environment and one or more query or other programming languages. An applications developer, who may be developing application programs for accounting, inventory control, finance, and so forth, as well as some scientific applications, can use the database management system to set up one or more databases in which data relevant to the application is stored in logical arrangements. Using a query language provided by the database management system, the applications developer may generate programs which facilitate retrieval of the data from the database, processing of the data, and organization of the processed data into reports.

A number of issues arise in connection with design of an application. One issue relates to the database design, that is, the number of databases, what types of data are to be stored in each database, and how the data are to be organized in each database.

A second issue is the types of reports that the application is to generate. Typically, an application is designed to generate certain types of reports, that is, reports presenting selected relationships among predetermined groupings of data from the databases. If, after the system is completed, a different type of report is required, that is one in which data is presented in a different manner, or if different groupings of data are to be used in generating the reports, a program must be developed, using the query language, to produce the report. This can often take substantial amounts of time for each report.

Some database management systems provide simplified query languages for developing programs for generating reports. Most of the simplified query languages require the user to have a significant amount of knowledge about how the data is organized in the databases, as well as the query language. Some "natural language" query languages have been developed, but they generally only reduce the amount of knowledge required in connection with the query language, permitting the database management system to recognize synonyms for a number of the operational commands specified by the query language. A user of a "natural language" query language has to know the organization of the databases.

SUMMARY OF THE INVENTION

The invention provides a new and improved system for facilitating management, retrieval, processing and reporting of data organized in one or more databases in a digital data processing system.

In brief summary, the new system includes one or more databases, a terminal for use by a user and a processor. The databases store data and retrieve the stored data in response to the receipt of a data retrieval request from the processor. The terminal generates an input screen and an output screen. The input screen displays, for the user, data selection criteria identifiers which the user may select to identify data of interest, and functions for processing the data as desired by the user. The output screen displays the processed data. The processor generates, in response to the selected data selection criteria from said terminal, a data retrieval request for processing by the databases. Upon receipt of the retrieved data, the processor processes the retrieved data as called for by the selected function selection criteria to generate processed data, which the processor transmits to the terminal for display on the output screen.

In a refinement, the processed data is identified by a data type, and said processor selecting a display type, for example, a line graph, bar graph, or other, based on the data type of the processed data, by which the output screen displays the data.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
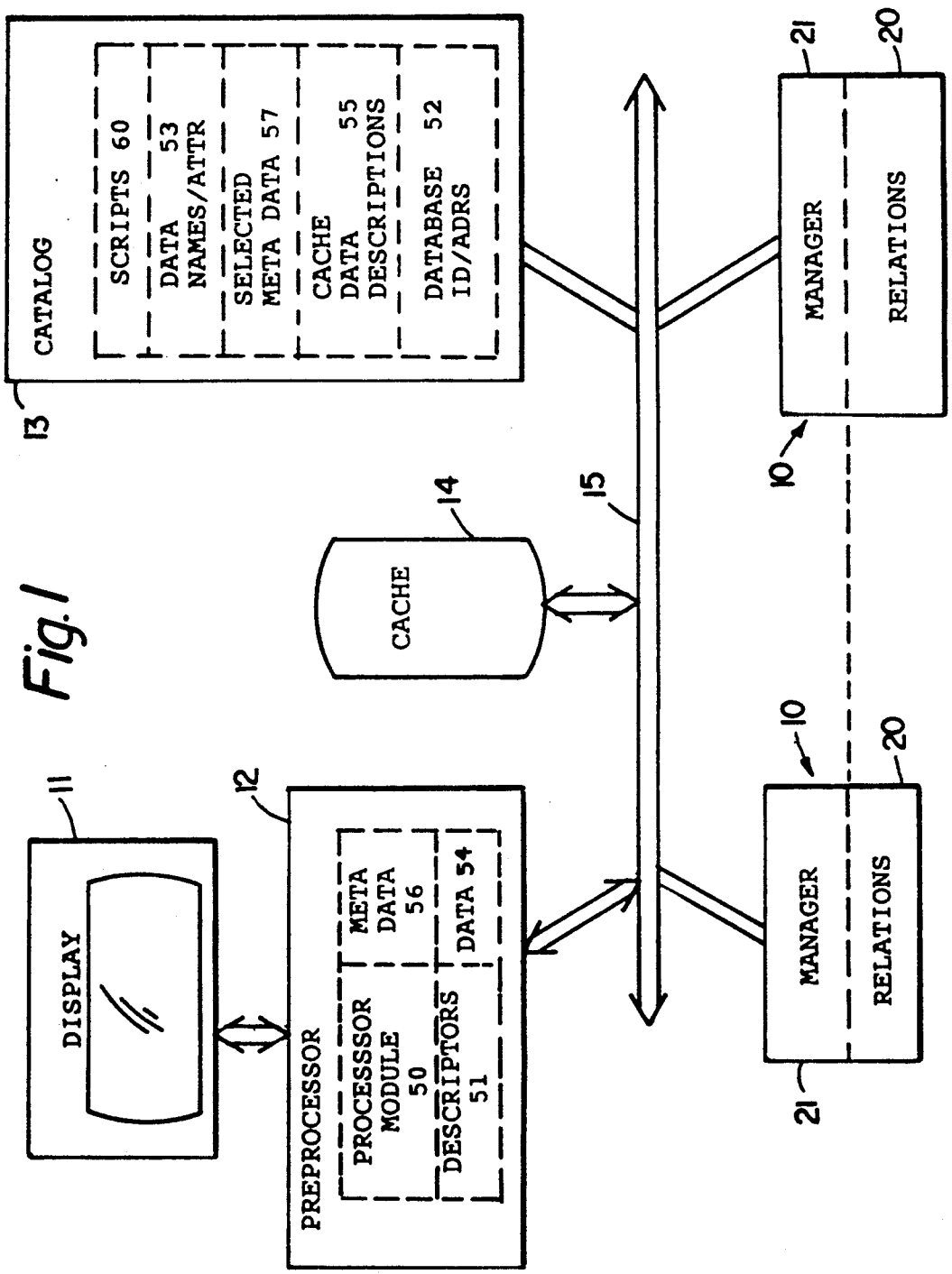
FIG. 1 is a functional block diagram of a system constructed in accordance with the invention.

FIG. 1 depicts a functional block diagram of a system constructed in accordance with the invention. With reference to FIG. 1, the system includes a plurality of databases, generally identified by reference numeral 10. The databases may be organized in one of a plurality of conventional organizational paradigms. In one specific embodiment, the databases 10 are organized as relational databases, with each database 10 including one or more relations, generally identified by reference numeral 20. Each relation 20 comprises a plurality of records, with each record, in turn, having a plurality of attributes. The relations in each database 10 are managed by a database manager 21 so that, upon receiving a retrieval request identifying a relation and attributes, it retrieves data from the relation which matches the attributes and supplies it to the requester in a conventional manner.

The system further includes a terminal 11 through which an operator can identify data, by providing the name of a relation containing data to be processed and the attributes for selecting the data. A preprocessor 12 initially enables the terminal 11 with an input display which is divided into four quadrants, which is shown in FIG. 2A.

Figure 2A:
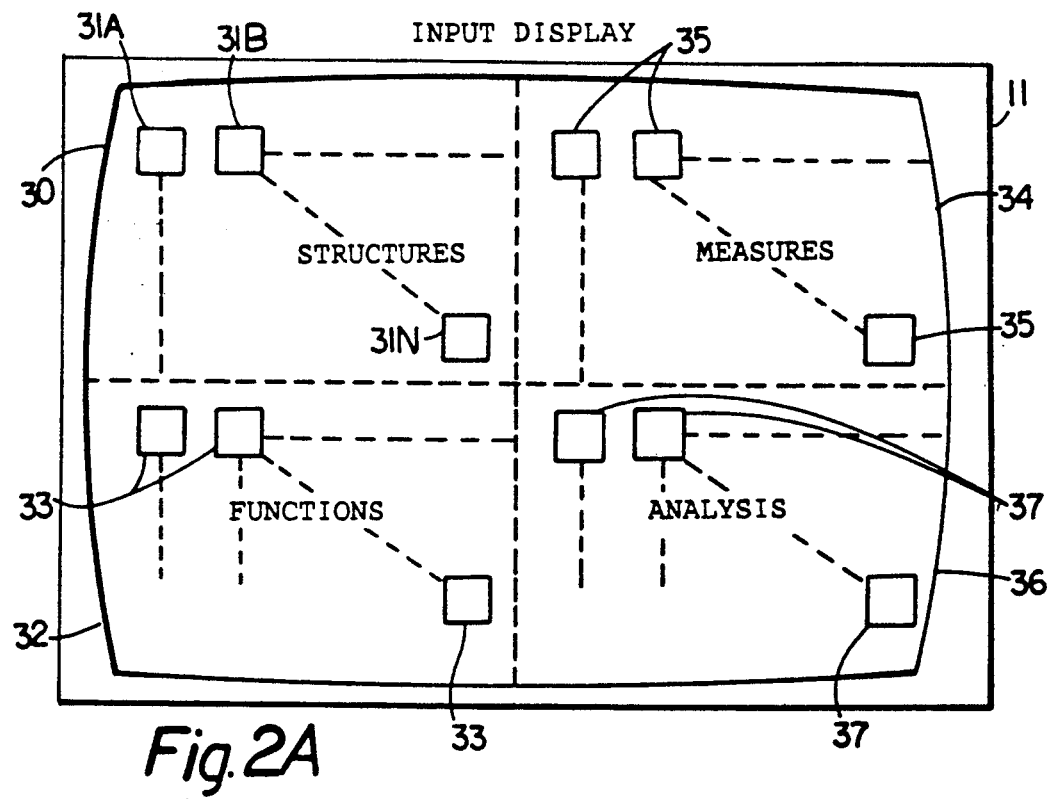
FIGS. 2(a)-(b) depict various screen displays used in the system.

With reference to FIG. 2A, a STRUCTURES quadrant 30 displayed at the upper left on the screen of terminal 11 includes a plurality of tiles 31A through 31N (generally identified by reference numeral 31), each identifying a type of data. For example, in a sales environment the tiles may identify geography, market segment, products or product lines, and so forth.

A FUNCTION quadrant 32 includes a plurality of tiles 33 which are grouped to identify functions which a user would normally use in processing the data. In a sales environment, a function may relate, for example, certified orders, percentage of allowances, percentage of discounts, and amounts received, each associated with a separate tile, with the tiles in each function being linked by numerical or other operators. In an accounting environment, the functions identified in the FUNCTION quadrant 32 may include a profit-ad-loss calculation function which includes tiles representing such items as, for example, receipts, gross margin and profit. By selecting or not selecting particular tiles in a function in the FUNCTION quadrant 32, the user can enable the system to ignore items or to use items in an analysis of the retrieved data.

The screen display depicted in FIG. 2A further includes a MEASURES quadrant 34 shown at the upper right. The MEASURES quadrant also includes a plurality of tiles 35 which permit a user to select such data retrieval limitations or selection criteria as dates, ranges, values, and so forth. Finally, the screen display also includes an ANALYSIS quadrant 36, which includes a plurality of tiles 37 that permit a user to select criteria in which the selected data are to be analyzed and displayed.

To initiate a data retrieval, the user selects tiles from all four quadrants 30, 32, 34 and 36, which together define a data retrieval request. The preprocessor 12 receives a data request from the terminal 11 and, using its resident information and information residing in a catalog 13, identifies the ones of database 10 which contain the requested data. The preprocessor 12 then, by transmitting a retrieval request over an interface 15, enables the databases 10 to retrieve the requested data and transfer it to the preprocessor. Upon receipt of the data, the preprocessor 12 notifies the operator through terminal 11. The preprocessor 12 may also enable, over interface 15, a cache 14 to cache the retrieved data.

Figure 2B:
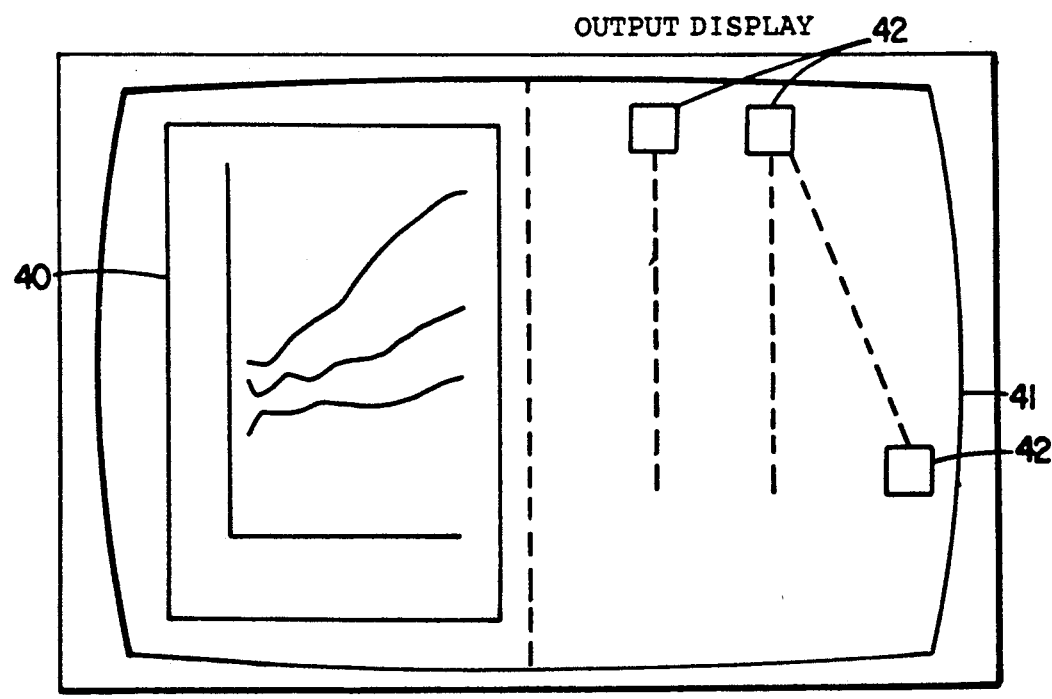

After receiving the requested data, the preprocessor 12 then displays the retrieved data, processed as defined in the function selected in the FUNCTION quadrant 32, to the user through the terminal 11, in an output display as depicted in FIG. 2B. With reference to FIG. 2B, the output display, on the left side contains an output region 40, in which the terminal 11 graphically depicts the processed data. A display selection section 41 on the right side of the display contains a plurality of tiles 42 which permit a user to select various display criteria. For example, if the processed data is presented in output region 40 as a function of time, the user may select the time scale or cycle. Similarly, the user may select the ranges of values along the axes of presentation, sorting criteria and so forth.

The preprocessor selects the type of display, that is, whether the processed data is displayed in line graph form, in bar-graph form, and so forth, which is shown in the display section 40 of the output display. The selection of the type of display is based on the type of data, that is, whether the data comprises nominal values, ordinal values, interval values or ratio values. Nominal and ordinal values are all integrally countable; examples include employees, states, products and product lines, and so forth. An interval value defines a value, such as temperature, pressure, or time, not starting at an absolute zero, which is meaningful only as a range. All other values are ratio values.

If the processed data comprise nominal or ordinal values displayed as a function of nominal or ordinal values, the processed data is displayed as a set of point values. If the processed data comprises nominal or ordinal values displayed as a function of interval or ratio values, or vice versa, the processed data is displayed as a bar graph, with the bases of the bars along the axis defining the nominal or ordinal values. Finally, if the processed data comprises interval or ratio values displayed as a function of interval or ratio values, the processed data is displayed as a line graph.

With this background, and with reference again to FIG. 1, the preprocessor 12 includes a processor module 50 which enables the terminal 11 to display an input screen (FIG. 2A) and receive indications from the terminal 11 as to the tiles 31, 33, 35 and 37 that the user selects. The processor module 15 uses descriptor information in a descriptor module 51 and script information in a script module 60 in catalog 13 to identify, based on the tiles selected, the types of data associated with each of the tiles and the relations 20 which contain the data. After identifying the relations 20 from the descriptors, the processor module uses the contents of a database identification/address module 52 in the catalog 13 to identify the databases 10 which contain the required data, and a data names/attributes module 53, also on the catalog 13, to formulate the required data retrieval request for each type of data required from the various databases 10.

After formulating the data retrieval requests for each of the databases 10 which contain data required for the tiles selected by the user at the terminal 11, the processor module 13 transfers the requests to the databases 10, and specifically the respective database managers 21, over interface 15 for processing. The database managers 21 retrieve the required data from their respective relations 20 and transfer the retrieved data over the interface 15 to the preprocessor 12. The processor module then enables the data to be stored in a data store module 54 and the cache 14, updating cache data descriptors in a cache data descriptor module 55 in the catalog 13. The cache data descriptors identify the retrieval criteria for the various items of data that are stored in the cache 14.

After the retrieved data has been stored in the data module 54 in the preprocessor 12, the processor module 50 initiates a processing operation on the data, according to the functions specified by the user in the tiles in the FUNCTIONS quadrant 32 of the input display of terminal 11 (FIG. 2A) and provides output graphs on the output display (FIG. 2B). In generating the output graphs, the processor module 50 uses the contents of a metadata module 56 in preprocessor module 12 and a selected metadata module 57 in the catalog 13, which describe the types of data, that is, whether the data is nominal, ordinal, interval or ratio, that is to be displayed. The processor module 50 uses the metadata information received from modules 56 and 57 to determine the manner in which the processed data is to be displayed and the graphs that are generated.

The system enables a user to generate data retrieval requests, and determine how the retrieved data is to be processed and displayed without having to know how to generate a query program to accomplish the result. The user can control the query, processing and various display criteria directly so as to ensure that the output display meets his needs. The user may generate the query and view the results in a much shorter time than if a programmer were required to generate a report program.

Furthermore the system facilitates mixing of diverse types of databases 10. The information provided by the descriptors in module 51, scripts in module 60, and names and attributes in module 53 which the processor 50 uses in the generation of the data retrieval request permits diverse types of databases to be provided in the system.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A system comprising:
   A. a database for storing data and for retrieving data in response to the receipt of a data retrieval criteria;
   B. a terminal including:
      i. an input screen display generated in response to receipt of said data retrieval criteria, said input screen display comprising:
         a. data selection criteria identifiers for selection by a user; and
         b. function selection criteria identifiers for selection by a user; and
      ii. means for selecting at least one of said data selection criteria identifiers and for selecting at least one of said functions selection criteria identifiers;
      iii. an output screen display, replacing said input screen display in said terminal in response to a selection of said data selection criteria and said function selection criteria, said output screen display comprising processed data;
   C. a processor for generating, in response to the selection of data selection criteria from said terminal, a data retrieval request and for processing the retrieved data as called for by the selection of function selection criteria to generate the processed data, the processor transmitting the processed data to the terminal for use in the output screen display.

2. A system as defined in claim 1 wherein the processed data is identified by a data type, said processor selecting a display type based on the data type of the processed data.

3. A system as defined in claim 1 wherein said input screen further comprises measure selection criteria identifiers for selection by a user, said processor using said measure selection criteria to limit the data retrieved and displayed by said data retrieval request.

4. A system as defined in claim 3 wherein said measure selection criteria comprises specific value and range limitations to be imposed on said data retrieval request to thereby limit said retrieved data.

5. A system as defined in claim 1 wherein said input screen further comprises analysis selection criteria identifiers for selection by a user, said analysis criteria determining characteristics of said processed data displayed on said output screen.

6. A system as defined in claim 1 wherein said output screen comprises:
   a. an output portion for displaying said processed data; and
   b. display selection criteria identifiers for selection by a user, said selected display selection criteria determining characteristics of processed data displayed in said output portion.

7. A system for graphically representing and manipulating data stored in a plurality of databases and for retrieving said data from said databases in response to receipt of a data retrieval request from a user, said system comprising:
   an input screen display generated in response to receipt of said data retrieval request, wherein said input screen display is divided into a plurality of sections all of which are displayed simultaneously and from which the user can select various data retrieval identifiers;
   means for selecting at least one of said data retrieval identifiers from said input screen display wherein said selected data retrieval identifiers are used to augment said data retrieval request;
   a processor for executing said data retrieval request in response to selection of said data retrieval identifiers, said processor further used for retrieving data from said database as called for by said data retrieval identifiers and for processing said retrieved data as called for by said data retrieval identifiers to generate processed data; and
   an output screen display for displaying said processed data, wherein said output screen display replaces said input screen display;
   wherien said data retrieval identifiers comprise:
      a. data identifiers displayed in a first of said sections of said input display screen for selection by a user, each of said data identifiers corresponding to at least one of said databases and at least one record and one field in said database, said processor using said data identifiers to retrieve the contents of said record and field in said database;
      b. function identifiers displayed in a second of said sections of said input display screen for selection by the user, said processor using said function identifiers to process said contents of said database records and fields for display;
      c. measure identifiers displayed in a third of said sections of said input display screen for selection by a user, said processor using said measure selection criteria to specify certain values or ranges of values to limit the data retrieved and displayed by said data retrieval request; and
      d. analysis identifiers displayed in a fourth of said sections of said input display screen for selection by a user, said processor using said analysis identifiers to determine display characteristics of said processed data as it is displayed on said output screen.

* * * * *

UNITED STATES PATENT AND TRADEMARK OFFICE
CERTIFICATE OF CORRECTION

PATENT NO.  : 5,088,052

DATED       : February 11, 1992

INVENTOR(S) : Spielman et al.

It is certified that error appears in the above-identified patent and that said Letters Patent is hereby corrected as shown below:

Col. 3, line 15, change "profit-ad-loss" to --profit-and-loss--.

Col. 4, line 19, after "and" insert --to--.

Col. 5, line 36, change "functions" to --function--.

Signed and Sealed this

Seventh Day of September, 1993

Attest:

BRUCE LEHMAN

Attesting Officer          Commissioner of Patents and Trademarks